United States Patent [19]
Sisler

[11] 3,727,971
[45] Apr. 17, 1973

[54] UTILITY RECEPTACLE UNITS FOR PICKUP-TYPE VEHICLE BOXES

[76] Inventor: Melvin L. Sisler, 14470 E. 13th, Space A23, Meadow Mobile Home Park, Aurora, Colo. 80010

[22] Filed: Mar. 17, 1971

[21] Appl. No.: 125,210

[52] U.S. Cl. ......296/37 R, 224/42.42 R, 296/23 MC
[51] Int. Cl. ............................................B62d 33/04
[58] Field of Search ................296/37 R, 24, 23 MC; 224/29 R, 42.42 R; 280/5 A; 220/60

[56] References Cited

UNITED STATES PATENTS

| | | | |
|---|---|---|---|
| 3,586,363 | 6/1971 | Omlid | 280/5 A |
| 3,326,595 | 6/1967 | Ogilvie | 296/37 R |
| 1,327,223 | 1/1920 | Boyle | 296/37 R |
| 1,480,247 | 1/1924 | Dove | 296/37 R |
| 2,380,557 | 7/1945 | Terry | 296/24 R |
| 2,530,578 | 11/1950 | Hotop | 296/24 R |
| 2,722,352 | 11/1955 | Dehnel | 296/24 R |

FOREIGN PATENTS OR APPLICATIONS 862,378    3/1961    Great Britain..........................296/39

Primary Examiner—Banjamin Hersh
Assistant Examiner—John A. Pekar
Attorney—Reilly and Lewis

[57] ABSTRACT

A horizontally elongated, utility receptacle unit, preferably provided in pairs, for location entirely within a pickup box to effectively utilize the space along both inner side walls and over the upwardly arched fender sections while leaving the space between the fender sections open for the full utilization thereof. The receptacle unit may be formed as a main container which may be filled with a particulate weight material such as gravel for increased wheel traction and the main container may have auxiliary containers or container sections at the ends thereof which may contain fluids such as water, gasoline and the like or afford additional storage space.

13 Claims, 3 Drawing Figures

PATENTED APR 17 1973 3,727,971

INVENTOR
MELVIN L. SISLER
BY
Reilly and Lewis
ATTORNEYS

UTILITY RECEPTACLE UNITS FOR PICKUP-TYPE VEHICLE BOXES

This invention relates to a novel longitudinally elongated, removable-type unitary receptacle unit adapted for effectively utilizing the space inside the side walls of a pickup vehicle box and over the upwardly arched fender sections.

Some pickup-type vehicles are provided with a box having upstanding fender sections over the wheels along each side thereof. These fender sections frequently result in a substantial amount of unused space. Utility boxes or receptacles heretofore provided in pickup-type vehicles have generally been adapted to be mounted on the outside of the vertical sides of the pickup box and have not attempted to more effectively utilize the space inside the box and particularly over the fender sections. Prior art receptacles for pickup boxes have usually been built into the box and have not been self-contained units which are readily placed within the box and easily removed therefrom as a unit.

Accordingly, it is a general object of this invention to provide a novel integral recetpacle unit for location entirely within a pickup-type vehicle for providing a storage capacity for tools and fluids such as gasoline and/or water and may be used to provide increased traction for the vehicle.

Another object of this invention is to provide a novel receptacle unit made up of at least one main container which may be fastened in place in the pickup-type box and readily removed and which may be provided with auxiliary containers which form longitudinal extensions of the main container.

Yet a further object of this invention is to provide a novel receptacle unit for pickup-type vehicles which may be readily molded as an integral unit from fiberglass or the like.

Still a further object of this invention is to provide a utility receptacle unit which may be used to hold sand for added weight distributed over the wheels, may hold tools, and may also contain fluids such as water and gasoline without materially interfering with the use of the vehicle box, the receptacle unit being sized to permit conventional camper bodies to be slid in place on the box without interference therewith.

SUMMARY

In a preferred embodiment of the present invention there is provided a novel self-contained receptacle unit in the form of a main container having a bottom shaped to straddle the upwardly arched fender section of the box and rest on the floor of the box forwardly and rearwardly of the fender section. The main container may have a movable closure to facilitate access thereinto and may be filled with a heavy particulate material such as sand to provide added weight or alternatively may be used simply for storage of tools or the like. The main container terminates outside the inner sides of the associated fender section so as not to interfere with the usable space between the fender sections. The receptacle unit may be made with auxiliary containers forming longitudinal extensions of the main container for additional storage or weight or in the alternative may be formed with pour spouts and contain gasoline, water and the like.

Other objects, advantages and capabilities of the present invention will become more apparent as the description proceeds taken in conjunction with the accompanying drawings in which.

Figure 1:
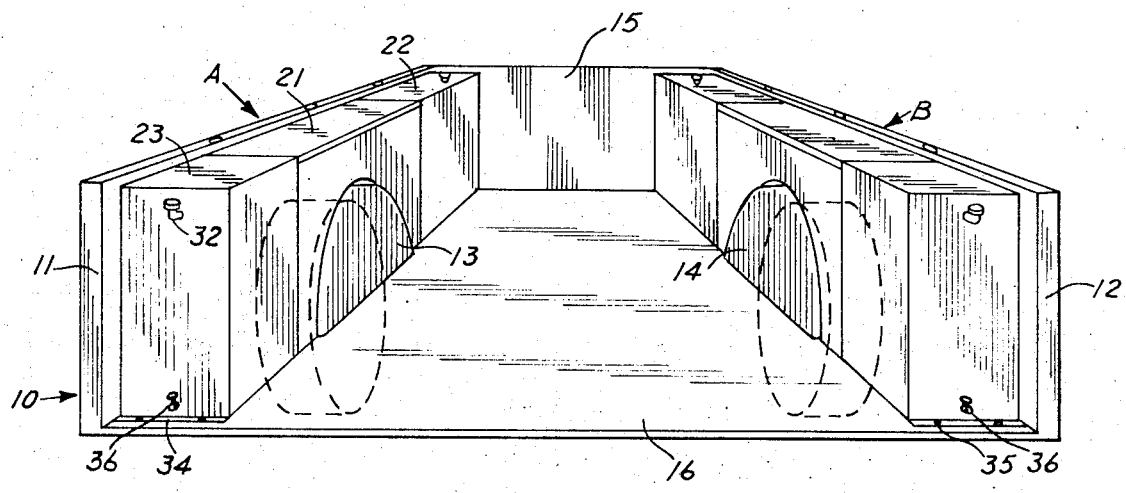
FIG. 1 is a perspective view of a pair of receptacle units embodying features of the present invention mounted in position in a pickup-type box.
Figure 2:
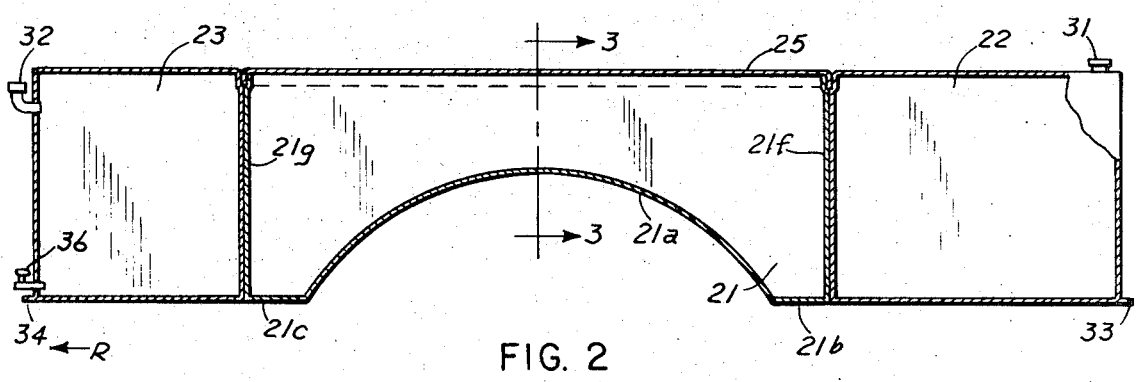
FIG. 2 is a vertical sectional view through the receptacle unit on the left side thereof.

Referring now to the drawings, in FIG. 1 there is represented a conventional open-type pickup box 10 having left and right vertical side walls 11 and 12, respectively, and left and right side upwardly arched fender sections 13 and 14, respectively, located over the rear wheels of the vehicle. The fender sections are usually found in the wide type pickup box and occupy a considerable amount of space therein. A forward wall 15 of the box extends across and joins the side walls at the front end thereof and a floor 16 joins the bottom edges of the side walls. Most conventional pickup-type boxes are equipped with a rear tailgate extending across the open rear end of the box but for clarity the tailgate is not shown in the drawings.

A pair of left and right side longitudinally elongated receptacle units designated A and B, respectively, are shown mounted inside the vehicle box and extend along the inner sides of the vertical sides. Each of the receptacle units A and B is of a similar construction and has the same size with one being adapted for the right side of the box and the other adapted for the left side of the box, but it is understood that the following description of one applies to both.

In describing the specific embodiment of the receptacle unit chosen for illustrating the invention, certain terminology is used for convenience to show relative position of the receptacle unit in the pickup-type box but has no limiting significance. For example, the terms "left" and "right" refer to the illustrated embodiments in their normal position of use in the box with reference to the drawing. The term "inner" and the term "outer" refer to the directions relative to the center of the box.

Each receptacle unit comprises a main container 21 and front and rear end auxiliary containers 22 and 23, respectively. The front and rear end containers are optional. The three containers shown are preferably formed separately and are secured together in place on the vehicle as a unit, but it is understood that the receptacle unit could be formed in a single mold with individual walls dividing the receptacle into separate compartments.

The main container 21 shown comprises a bottom including an upwardly arched intermediate section 21a conforming or complementary to the shape of the fender section and front and rear sections 21b and 21c which rest on the floor of the box forwardly and rearwardly of the fender section which serve to support the container. The intermediate bottom section 21a may be upwardly curved far enough so that it will fit a variety of conventional pickup-type boxes and may either rest on the fender section or be supported above the fender section on the bottom front and rear sections. The front and rear bottom sections will preferably extend to the front and rear of the fender section equal distances.

The main container 21 has inner and outer vertical side walls 21d and 21e, respectively, which are joined at the bottom edge thereof to an adjacent bottom edge of the bottom. The outer side wall extends along and in closely spaced or abutting relation to the inside of the box, and the outer side wall is disposed parallel to the inner side wall and terminates just outwardly of the inner edge of the fender section so that the container does not occupy or interfere with any of the space between the fender sections. In turn, the container 21 has vertical front and rear end walls 21f and 21g, respectively, which are joined at the bottom edge thereof by adjacent edges of the front and rear sections, respectively, and to the adjacent edges of the side walls to form a container which has a top opening.

Figure 3:
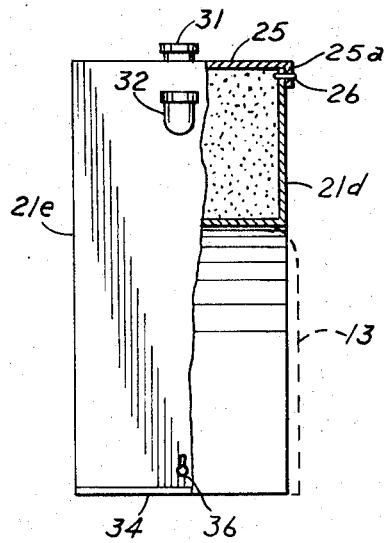
FIG. 3 is a partial sectional view taken along lines 3—3 of FIG. 2 with the associated underlying fender section shown in dashed lines.

The top opening is closed by a removable top closure 25 having downwardly extending flanged edges 25a on the sides and ends thereof adapted to fit over the top edge of the container. The top closure 25 is fastened in place by means of screws 26 or the like which extend through the inner flange into the inner side wall 21d, as best seen in FIG. 3. The upper margins of the end walls 21f and 21g may be recessed slightly in the outer surface to facilitate the securing of the end containers in a flush relation while permitting removal and replacement of the top closure. The top closure is removed to permit access into the container by the removal of the screw fasteners 26.

The main container 21 is shown in FIG. 3 to be filled with a gravel-type particulate material. This affords a significant amount of weight in a distributed manner over the rear wheels to greatly increase the traction thereof. While the utilization of container 21 may be for added weight in the back of the vehicle, it is understood that main container 21 may also be utilized for the storage of tools or the like.

The front and rear end auxiliary containers 22 and 23 are in the form of a hollow thin-walled body sized to form a longitudinal extension or continuation on the ends of the main receptacle. The front end container 22 has a normally closed pour spout 31 in the top wall thereof and preferably contains gasoline or the like, and the rear container has a normally closed pour spout 32 extending through the rear wall thereof and preferably contains water. The front container 22 is formed with a front flange 33 which affords a means for attaching the receptacle unit to the vehicle box with fasteners such as bolts 35 or the like which extend into the floor of the vehicle box, and the rear container also has a rear flange 34 coextensive with its bottom edge through which bolts 35 or the like may extend to fasten the rear end of the unit. The rear container 23 is provided with a valve-controlled spigot or drain spout 36 to facilitate the removal of selected quantities of water therefrom. When the front container 22 is filled with gasoline it will be provided with a valve-controlled outlet line Y-connected to the gas line leading to the engine to run the vehicle. When only the main container unit is being used, it is provided with the front and rear flanges formed on the front and rear end walls 21f and 21g of the main container.

From the foregoing it is apparent that the weight in the main container 21 will be directly above and in a balanced arrangement over the wheels and will be effective in greatly increasing the amount of traction which can be achieved with the vehicle on muddy or snowy roads. The front and rear end auxiliary containers will afford a significant amount of container capacity without materially limiting the overall carrying capacity of the pickup box. A receptacle unit of the type described does not interfere with conventional camper bodies, which are shaped with relatively large side recesses adapted to clear the space above the fender sections.

Although the present invention has been described with a certain degree of particularity, it is understood that the present disclosure has been made by way of example and that changes in details of structure may be made without departing from the spirit thereof.

What is claimed is:

1. In a utility receptacle unit for each wheel of pickup-type vehicles having a rear box with spaced parallel upstanding sides and upwardly arched fender sections located in the box inwardly of each upstanding side, the combination comprising; receptacle means for each wheel inside the sides of the box adapted to seat on the box and containing a weight material for providing a weight above the associated wheel for increased wheel traction without interference with the space normally occupied by the camper body supported in the vehicle box, each receptacle means including a bottom with an upwardly arched intermediate bottom section for overlying a fender section and wheel of the vehicle and forward and rear bottom sections for forming end extensions on the intermediate bottom section, vertical side and end walls each joined along a bottom edge thereof to said bottom and terminating below the sides of the vehicle to form a compartment, the inner vertical side wall being sized to terminate outwardly of the inner wall of the associated fender section to leave the space in the box inwardly of the associated fender section open, and fastening means on each unit adapted to be secured inside the vehicle box.

2. In a utility receptacle unit as set forth in claim 1 wherein said forward and rear bottom sections extend an equal distance from the ends of said arched intermediate section to provide for a balanced weight distribution over the associated wheel.

3. In a utility receptacle unit as set forth in claim 1 wherein said fastening means is in the form of a flange projecting outwardly from the bottom of each end of the unit adapted to receive fasteners to secure the unit to the floor of the box.

4. In a utility receptacle unit as set forth in claim 1 including at least one auxiliary container forming a longitudinal extension of said bottom and said side walls.

5. In a utility receptacle unit as set forth in claim 1 including a movable top closure adapted to be fastened in a closing relation over a top opening in the compartment.

6. In a utility receptacle as set forth in claim 5 wherein said top closure has a recessed underside forming downturned flanges adapted to extend down over the tops of the side and end walls.

7. In a utility receptacle as set forth in claim 6 including fastening means adapted to extend through the inner flange and into the inner side wall to removably fasten the top closure in place.

8. In a utility receptacle as set forth in claim 1 wherein said container is a one-piece unit made of molded fiberglass.

9. In combination with a conventional pickup-type vehicle having a rear box with a pair of spaced parallel vertical sides and a pair of upwardly arched fender sections located in the box inwardly of each vertical side and over the rear wheels of the vehicle, a utility receptacle means for each wheel inside the sides of the box containing a weight material for providing a weight above the associated wheel for increased wheel traction without interference with the space normally occupied by a camper body supported in the vehicle box, each receptacle means including a main container having a movable closure to permit access thereinto, a bottom including a upwardly arched section located over an associated fender section, an outer side wall extending along and in close proximity to an associated vertical side of the box, and an inner side wall terminating outwardly of the associated fender section leaving open the space in the box upwardly of the fender section, a front auxiliary container secured to and forming a longitudinal front extension of the main container, and a rear auxiliary container secured to and forming a longitudinal rear extension of the main container.

10. In a utility receptacle unit as set forth in claim 9 wherein said main container is filled with a material for providing weight in the back of the vehicle above the rear wheels.

11. In a utility receptacle unit as set forth in claim 9 wherein said front auxiliary container has a pour spout and contains gasoline.

12. In a utility receptacle unit as set forth in claim 11 wherein said rear auxiliary container has a pour spout and contains water.

13. In combination with a conventional pickup-type vehicle having a rear open-type box with a pair of spaced parallel vertical sides and a pair of upwardly arched fender sections located in the box inwardly of each vertical side over the rear wheels of the vehicle, a pair of utility receptacle means mounted on the inside of the box extending longitudinally of the box over the fender sections, each receptacle means for each wheel containing a weight material for providing a weight above the associated wheel for increased traction without interference with a camper body supported in the vehicle box, each said receptacle means including a main container having a movable closure to permit access thereinto, a bottom including an upwardly arched section located over an associated fender section and an outer side wall extending along and in close proximity to an associated vertical side of the box and an inner side wall terminating outwardly of the associated fender section leaving open the space in the box between the fender sections, a front auxiliary fluid container forming a longitudinal front extension of the main container, and a rear auxiliary container and fastening means on the ends of the unit detachably secured to the floor of the box.

* * * * *